United States Patent
Weldy

(10) Patent No.: US 7,085,008 B2
(45) Date of Patent: *Aug. 1, 2006

(54) DIGITAL COLOR IMAGE PROCESSING METHOD FOR IMPROVED TONE SCALE REPRODUCTION

(75) Inventor: John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 966 days.

This patent is subject to a terminal disclaimer.

(21) Appl. No.: 10/102,293

(22) Filed: Mar. 20, 2002

(65) Prior Publication Data

US 2003/0179392 A1 Sep. 25, 2003

(51) Int. Cl.
*G06K 1/00* (2006.01)

(52) U.S. Cl. .................. 358/1.9; 358/518; 358/2.1; 358/520; 358/522; 358/1.9

(58) Field of Classification Search ............. 358/518, 358/2.1, 520, 522, 1.9
See application file for complete search history.

(56) References Cited

U.S. PATENT DOCUMENTS

| | | | |
|---|---|---|---|
| 4,677,465 A | 6/1987 | Alkofer | 358/80 |
| 4,729,016 A | 3/1988 | Alkofer | 358/80 |
| 4,731,671 A | 3/1988 | Alkofer | 358/284 |
| 4,984,071 A | 1/1991 | Yonezawa | 358/80 |
| 5,062,058 A | 10/1991 | Morikawa | 364/521 |
| 5,265,200 A | 11/1993 | Edgar | 395/131 |
| 5,555,022 A * | 9/1996 | Haruki et al. | 348/223.1 |
| 5,673,336 A | 9/1997 | Edgar et al. | 382/167 |
| 5,812,286 A | 9/1998 | Lin | 358/519 |
| 2002/0135683 A1 * | 9/2002 | Tamama et al. | 348/222 |

FOREIGN PATENT DOCUMENTS

| | | |
|---|---|---|
| EP | 0 430 165 A | 6/1991 |
| EP | 0 773 470 A | 5/1997 |
| EP | 1 185 083 A | 3/2002 |
| GB | 2 352 354 A | 1/2001 |

OTHER PUBLICATIONS

Patent Abstracts of Japan, vol. 2000, No. 20, Jul. 10, 2001 & JP 2001 069352 A (Canon Inc.), Mar. 16, 2001 *abstract; figures 3, 4, 9*.
Patent Abstracts of Japan, vol. 2002, No. 2, Apr. 2, 2002 & JP 2001 292332 A (Seiko Epson Corp.), Oct. 19, 2001 *abstract*.

* cited by examiner

*Primary Examiner*—David Moore
*Assistant Examiner*—Michael Burleson
(74) *Attorney, Agent, or Firm*—David M. Woods

(57) ABSTRACT

A method for adjusting the tone scale reproduction of a color image composed of pixels provided in a plurality of color channels is based on generating a reference image from a combination of the color channels, whereby each spatial coordinate of the reference image is characterized by a reference image level. Channel averages of the color channel values of the pixels that correspond to the different valued reference image levels are generated. A channel tone scale transformation is formed by relating each channel average to its corresponding reference image level, and the channel tone scale transformation is utilized on a pixel by pixel basis in the respective channels of the digital color image to produce a processed digital color image having improved tone scale reproduction.

20 Claims, 5 Drawing Sheets

DIGITAL COLOR IMAGE PROCESSING METHOD FOR IMPROVED TONE SCALE REPRODUCTION

CROSS REFERENCE TO RELATED APPLICATION

The present invention is related to commonly-assigned U.S. patent application Ser. No. 10/101,657 entitled "Digital Color Image Processing Method" and filed on even date herewith in the name of J. A. Weldy.

FIELD OF THE INVENTION

The present invention relates to methods of processing digital color images, and more particularly to a method of adjusting the color reproduction of a digital color image.

BACKGROUND OF THE INVENTION

In photographic printing of film, such as a color photographic negative, it is a well-known practice to 'correct' the color balance by causing the overall color balance of the print to be a shade near gray. This correction strategy is based on the assumption that the overall average of the scene integrates to a gray color and is very effective at reducing the effects resulting from different scene illuminants that are spectrally different such as tungsten and daylight. In a like manner, image sensing apparatus such as a video camera averages color difference signals, R-Y and B-Y, over a time period to a zero value. This is equivalent to integrating to gray.

These methods work well for the majority of scene and illuminant combinations. However, when the scene subject matter is highly colored, particularly with a single dominant color, the 'integrate to gray' strategy fails as this dominant scene color is mistaken for an illuminant bias. This failure, known as subject failure, produces unpleasant colored casts in the color complementary to the dominant scene color. There are various strategies for minimizing these failures. These strategies are typically based on reducing the amount of correction based on a population of images and/or on the information in neighboring frames. Other color problems result from fading of the dyes in a photographic image, printing and processing errors, film keeping problems, and in the case of a color digital image that is captured directly with an electronic camera, an improperly adjusted black or white point in the camera.

With a digital color image obtained either directly from an electronic camera or indirectly by scanning a photographic print or film, it is possible to manually adjust the color balance by using any of the well known digital photographic manipulation tools, such as those provided by Adobe Photoshop®. However, manual adjustment is not practical for automated printing of digital images. A digital image provides much information that can be used for calculating color adjustments, and several methods have been proposed for performing these adjustments automatically. Some of these methods, such as that taught in U.S. Pat. No. 5,555,022 issued Sep. 10, 1996 to Haruki et al., divide the scene information into a plurality of regions or blocks representing different locations within a scene. Means to select and weight the correction of these blocks are then employed to provide automatic white balancing and to restrict the degree to which color correction gain is applied. U.S. Pat. No. 4,984,071 issued Jan. 8, 1991 to Yonezawa teaches a method for adjusting a gradation curve based on identifying shadow and highlight points by utilizing histogram data. U.S. Pat. No. 5,062,058 issued Oct. 29, 1991 to Morikawa describes a system that uses a cumulative histogram to designate highlight and shadow points. Other histogram based methods are taught by U.S. Pat. No. 5,812,286 issued Sep. 22, 1998 to Lin, and U.S. Pat. No. 5,265,200 issued Nov. 23, 1993 to Edgar.

While adjusting the gain and offset of individual color channels based on black and white points determined by the above mentioned methods significantly improves many digital color images, greatly biased digital color images, such as those that result from scanning severely underexposed films and color prints or transparencies that have suffered image quality loss owing to dye fade, oftentimes require non-linear adjustment of individual color channels. In the above mentioned U.S. Pat. No. 5,265,200, Edgar describes a method performing a second order best fit regression of the histogram data and includes methods to eliminate some histogram values from consideration in the regression. Edgar assumes, that by having eliminated some image pixels, that the shapes of individual color histograms, while possibly different, can be described by second order polynomials. Unfortunately, many histograms from digital color images are not well described, even with aggressive pixel rejection, by a second order best regression between channel code value level and frequency of occurrence of code value.

Another channel independent histogram method taught by Lin in the aforementioned U.S. Pat. No. 5,812,286, features independent color channel non-linear tone scale adjustment based on an additional parameter, such as the channel median. This allows a channel independent shaping of the color tone scale by a single parameter curve such as a gamma curve.

Another approach that combines color correction with tone scale corrections is based on random sampling within a digitized image and subsequently modifying the resulting histogram of these samples. Commonly assigned U.S. Pat. No. 4,677,465 issued Jun. 30, 1987 to Alkofer, and commonly assigned U.S. Pat. No. 4,729,016 issued Mar. 1, 1988 to Alkofer, disclose relatively complex methods that utilize these samples in a plurality of segmented contrast intervals through normalization techniques and with comparison to image population data.

Many of the above cited channel independent histogram methods only utilize a fraction of the image data near the ends of the histogram data. Furthermore, even in the cases where more data from individual color channel histograms are used, individual color channel histograms do not maintain any linkage of channel information at the pixel level. In other words, unless the image is monochrome, the pixels for a particular level in the histogram for one channel correspond to many levels in the other channels. This lack of linkage can cause errors with the above described histogram methods, particularly when there are highly saturated colors and when there is clipping of the image data. Thus there is a need therefore for an improved digital image processing method for automatically adjusting the color of a digital color image.

SUMMARY OF THE INVENTION

The present invention is directed to overcoming one or more of the problems set forth above. Briefly summarized, according to one aspect of the present invention, a method for adjusting the tone scale reproduction of a color image composed of pixels provided in a plurality of color channels is based on a reference image generated from a combination of the color channels, whereby each spatial coordinate of the reference image is characterized by a reference image level. Channel averages of the color channel values of the pixels that correspond to the different valued reference image levels are generated. A channel tone scale transformation is formed by relating each channel average to its corresponding reference image level, and the channel tone scale transformation is utilized on a pixel by pixel basis in the respective channels of the digital color image to produce a processed digital color image having improved tone scale reproduction.

The present invention has advantages in that it retains channel data linkage at the pixel level, minimizes the contribution of highly colored pixels in determining the white and black points, provides color channel independent tone scale transformations required to correct severe color biases, can be easily combined with masking techniques, and can be combined additional digital image processing steps to further improve performance.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing color correction and modification are well known, the present description will be directed in particular to attributes forming part of, or cooperating more directly with, the method in accordance with the present invention. Attributes of the method not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

Figure 1:
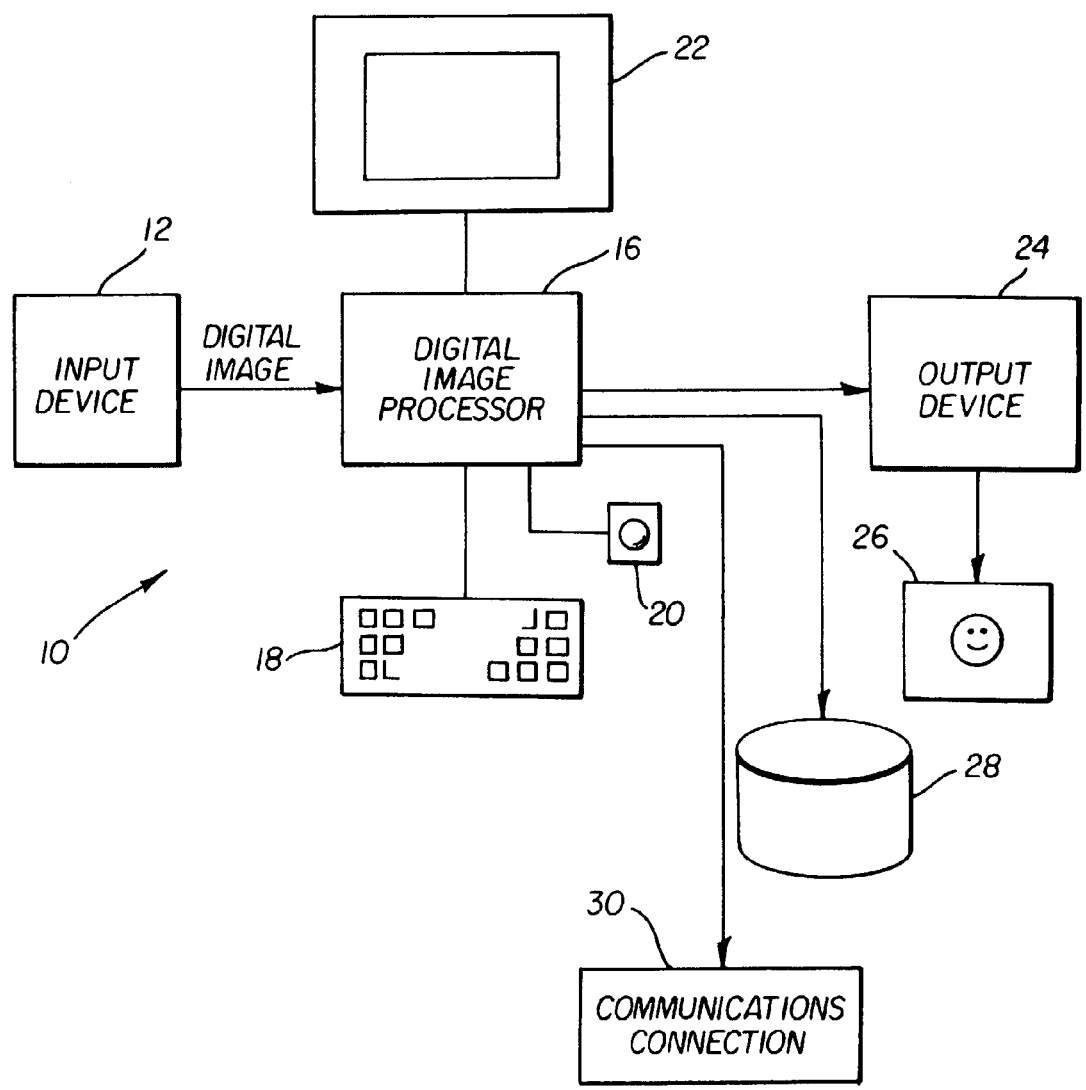
FIG. 1 is a schematic block diagram illustrating an image processing system suitable for performing the digital image processing method according to the present invention.

Referring to FIG. 1, an image processing system, generally designated 10, suitable for performing the image processing method of the present invention includes for example an input device 12, such as a scanner for scanning photographic film or prints, or a digital camera, for producing a digital image. Alternatively, digital images may be sourced from a digital data storage device and/or accessed via the World Wide Web, whereupon the input device 12 would include the storage device or a network access to the Web. The input device 12 produces a digital image signal having a plurality of color channels (e. g., red, green and blue) that are supplied to a digital image processor 16. The digital image processor 16 is a programmed computer and can be, for example, a general purpose digital computer such as a PC, or minicomputer, or a computer that is specially designed for processing digital images. The digital image processor 16 is provided with operator interface devices such as a keyboard 18 and a mouse 20. The system 10 may include display devices, such as a color monitor 22, and one or more output devices 24 connected to the digital image processor 16. The output device 24 may be as a color hardcopy printer (e.g, an ink jet or thermal printer) for producing a color hard copy print 26 of the processed digital image. The system may also include a digital image store 28, such as an optical disk storage unit for storing the processed images, and a communications connection 30, such as a modem for communicating the images to a remote location.

Figure 2:
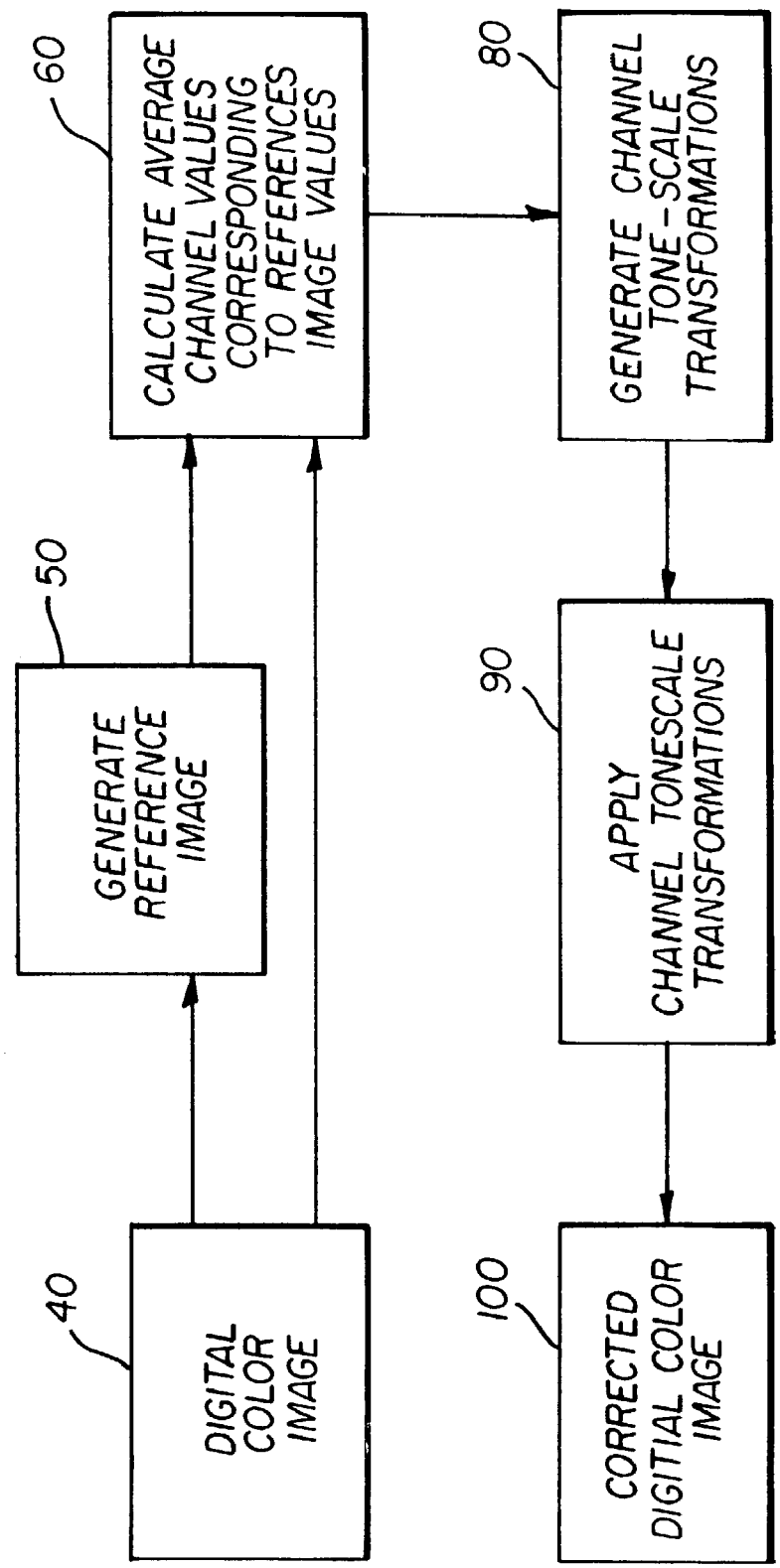
FIG. 2 is a schematic diagram illustrating the digital image processing method according to the present invention.

Referring to FIG. 2, the image processing method of the present invention includes the steps of generating (step 50) a reference image from the digital multi-channel color image 40. Preferably, the multi-channel color image 40 has been already mapped to good relative white and black points by a method such as disclosed in the aforementioned cross-referenced, copending application Ser. No. 10/101,657. This adjustment allows for improved weighting of regressions described in detail below. Next, average channel values corresponding to each reference image value are calculated (step 60). A plurality of reference image values and channel averages corresponding to these reference image values, preferably limiting the contribution from highly colored portions of the digital image, are used to generate channel-unique transformations (step 80). These channel unique transformations are applied to the color digital image in step 90 to form a corrected color digital image 100. The following description provides details of each of these steps.

The reference image is generated (step 50), for example, by forming a linear combination of the color channels in the digital color image. In general, when the image has red, green, and blue color channels, the reference image $W_{i,j}$ is generated as follows:

$$W_{i,j} = C_1 \times r_{i,j} + C_2 \times g_{i,j} + C_3 \times b_{i,j} \qquad \text{Eq. (1)}$$

where each value $W_{i,j}$ is the image value of the reference image W for the spatial coordinates i,j; $C_1$, $C_2$, and $C_3$ are positive or zero valued constants; and $r_{i,j}$, $g_{i,j}$, and $b_{i,j}$ are the values for the pixel located at spatial coordinates i,j of the red, green, and blue digital color image channels. The constants $C_1$, $C_2$, and $C_3$ may be set to sum to unity, for example, $C_1 = C_2 = C_3 = \frac{1}{3}$, whereby if the code values of each channel of the digital image range from 0 to 255, the pixels of the reference image will be likewise restricted to range from 0 to 255, thereby facilitating further processing.

Next, channel averages CA, that is, the average of each channel for all pixels having a particular reference image value, are calculated (step 60) for least two different valued reference image levels. The calculation of the channel averages is detailed in the following equations (2a, 2b, 2c):

$$CAr(k) = \frac{\sum_{P(k)} r_{i,j}}{N(k)} \qquad \text{Eq. (2a)}$$

$$CAg(k) = \frac{\sum_{P(k)} g_{i,j}}{N(t)} \qquad \text{Eq. (2b)}$$

$$CAb(k) = \frac{\sum_{P(k)} b_{i,j}}{N(k)} \qquad \text{Eq. (2c)}$$

where: CAr(k) is the red channel average at the kth reference image level, CAg(k) is the green channel average at the kth reference image level, CAb(k) is the blue channel average at the kth reference image level, N(k) is the number of pixels in the kth reference image level, and P(k) are the pixels, with spatial coordinates i,j in the kth reference image level.

Figure 3A:
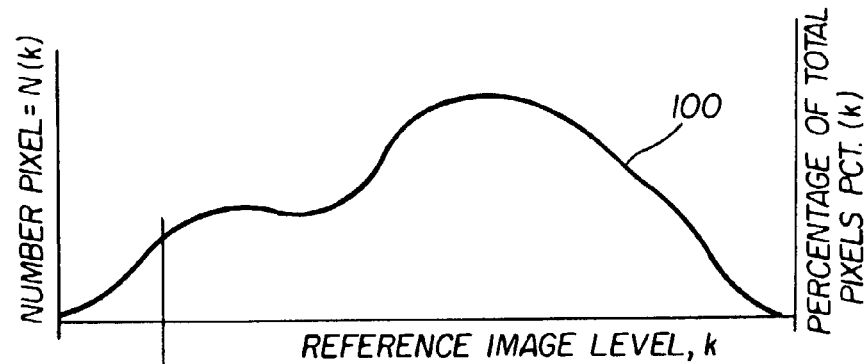
FIG. 3(a) is a histogram of a reference image illustrating how channel averages are formed.
Figure 3B:
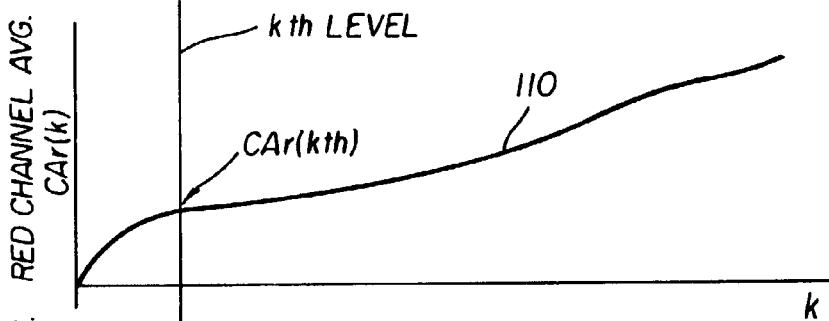
FIGS. 3(b), 3(c) and 3(d) are plots of the red, green and blue channel averages.
Figure 3C:
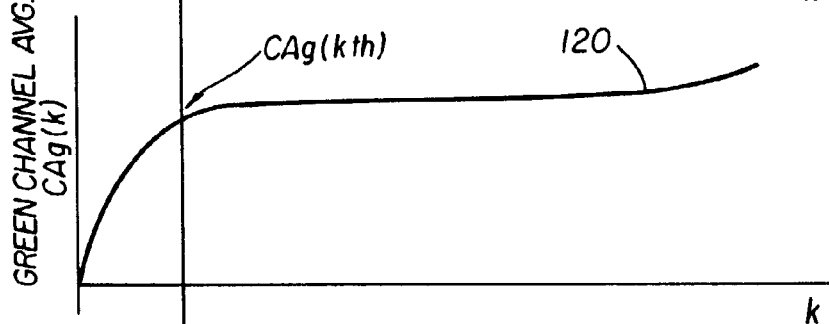
Figure 3D:
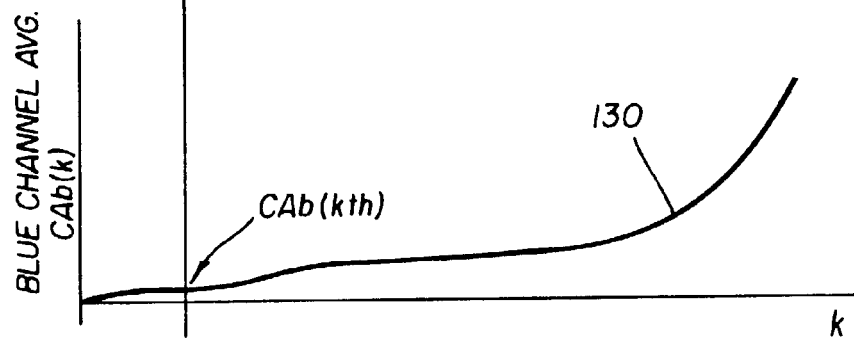

While reference image levels may be calculated directly by summing and averaging the value of all pixels constituting these levels, forming a histogram of the reference image is one way of generating a larger plurality of reference image levels of the reference image. FIG. 3(a) shows a histogram 105 of the reference image W generated by the step 50. The histogram 105 is a graphical representation plotting the number of pixels N(k) on the ordinate axis versus reference image level k, which spans the range of reference image values, on the abscissa. Alternatively, FIG. 3(a) represents the percentage of pixels at each reference image level k, as indicated by the axis on the right side of FIG. 3(a). FIGS. 3(b), 3(c) and 3(d) share the same abscissa as FIG. 3(a) and are graphical representations plotting the red, green and blue channel averages CAr(k) 110, CAg(k) 120, and CAb(k) 130, respectively, versus the reference image level k. Note that FIGS. 3(b), 3(c) and 3(d) are NOT histograms as the ordinate axes are channel averages, NOT a number count or percentage. For any k value, red, green, and blue channel averages are calculated as indicated in equations (2a, 2b, 2c). Also note that in FIGS. 3(a), 3(b), 3(c) and 3(d) the reference image value that corresponds to the kth channel averages is the reference image level k.

Improved channel averages can be obtained by eliminating outlier pixel values using well-known statistical techniques such as eliminating pixels with values that are more than two standard deviations from the average value. In this case, channel averages are then recalculated having removed outliers from the averaging process.

Additional improvements to both the reference image or W histogram and channel averages at each W image level are possible. An example of such an improvement is to non-equally weight the value of each pixel used in calculating the reference image histogram and/or in calculating the average channel value at each reference image level. Example non-equal weightings include: eliminating or weighting pixels where one or more of the pixel channel values is at the maximum or minimum of the range of values observed in that channel, eliminating or weighting pixel values for pixels that form a border or lie at the outside edges of the digital color image, eliminating or weighting pixel values for pixels that are highly colored, and/or eliminating or weighting pixels based on the magnitude of the output from a high or band pass spatial filter representation of the digital color image. Using results from a high or band pass spatial filter as a weighting means is well known in the art; a good example is described in commonly assigned U.S. Pat. No. 4,731,671, which issued to Alkofer on Mar. 15, 1988.

Additional improvements are possible by smoothing reference image values $W_{i,j}$ and/or channel averages CAr(k), CAg(k), and CAb(k) by combining reference image values and/or channel averages from similarly valued reference image values and/or channel averages.

Figure 4A:
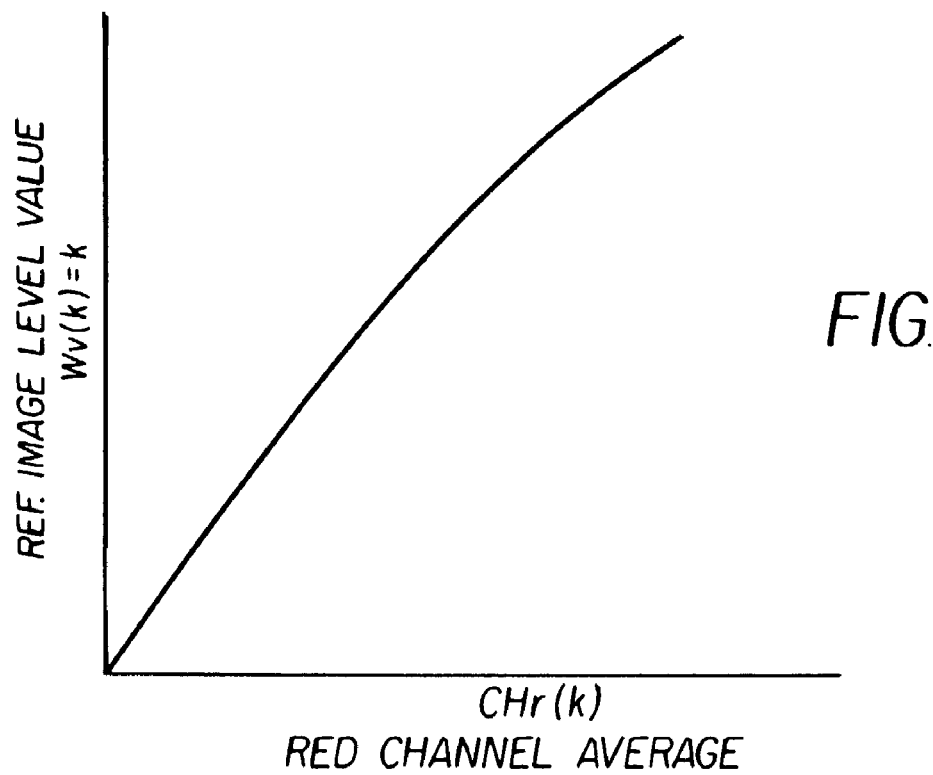
FIG. 4(a) is a plot of reference image level values versus channel averages used to illustrate the formation of the tone scale transformation for the red channel.
Figure 4B:
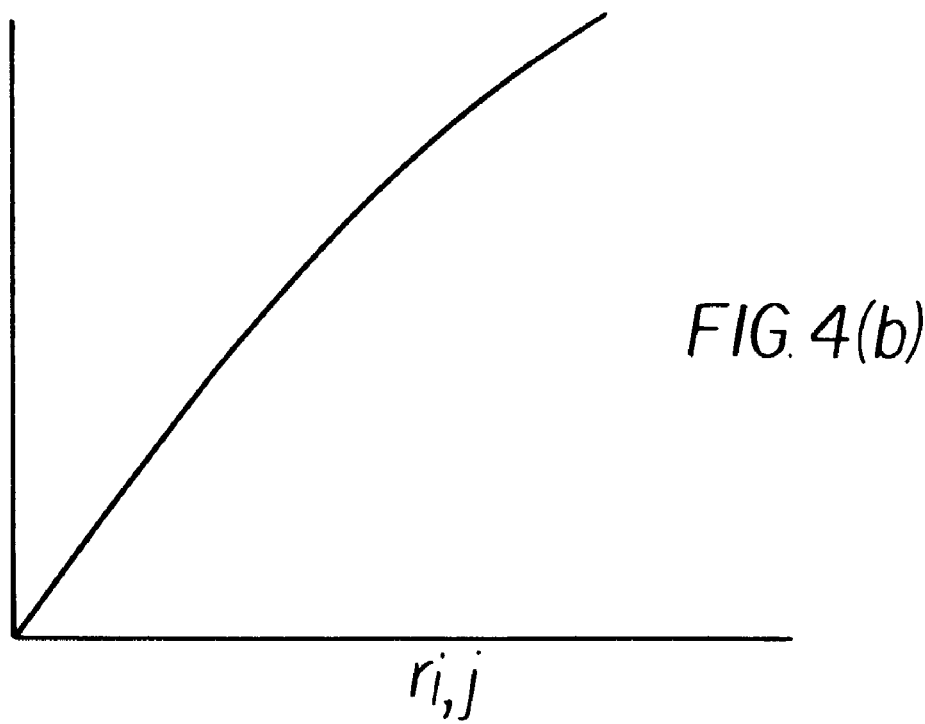
FIG. 4(b) is an example of the application of the thus-formed tone scale transformation to red values in the red channel.

For each color channel, a channel tone scale transformation function is formed (step 80) by relating each channel average to its corresponding reference image value as shown below (for the red channel) in equation (3). Although Equation (3) describes the mapping for the red channel only, the green and blue channel tone scale transformations are formed and applied in the same manner as the red.

$$T_R = F_R[CAr(k), Wv(k)] \qquad \text{Eq. (3)}$$

where $T_R$ is a mapping function derived from channel averages CAr(k) and their corresponding reference image level values Wv(k), and $F_R$ is the functional form of this mapping. The functional form $F_R$ of this mapping can take several well-known forms, including a look up table that maps channel average value to its corresponding reference image value. FIG. 4(a) is an exemplary plot of reference image level values versus channel averages in the red channel, formed by re-arranging the data shown in FIG. 3(b), which graphically illustrates the transformation mapping function described by Equation (3). The thus-formed transformation mapping function is then applied to the tone scale transformation of input red values $r_{i,j}$ to new red values $r'_{i,j}$, as shown in FIG. 4(b). Similarly, transformation mapping functions are generated for the blue and green channels, and then applied to the tone scale transformation of input blue and green values $b_{i,j}$ and $g_{i,j}$ to new blue and green values $b'_{i,j}$ and $g'_{i,j}$.

An alternate functional form $F_R$ of this mapping is one derived by regressing the set of channel averages versus the set of reference image level values. For example, the aim reference image values could be modeled as a polynomial in channel averages:

$$r'_{i,j} = A_{0R} + \sum_{m=1}^{M} A_{m,R} \cdot r^m_{i,j} \qquad \text{Eq. (4)}$$

where $A_0 \ldots A_{M,R}$ are the coefficients of the $M^{th}$ order polynomial in $r_{i,j}$ and $r'_{i,j}$ is the new red value having processed $r_{i,j}$ with this polynomial. The coefficients, $A_0 \ldots A_{M,R}$ of this model can be solved by linear least squares methods. Similarly, the channel averages are regressed against the reference image level values in the blue and green channels, and the aim reference image values are thereby modeled as a polynomial in channel averages for the blue and green channels. Alternatively, other models, such as one based on a rational linear-quadratic function, could be derived by using non-linear optimization techniques. This function, and other non-linear functions, can have an advantage in maintaining the concavity or convexity of the resulting tone scale transformation.

Figure 5:
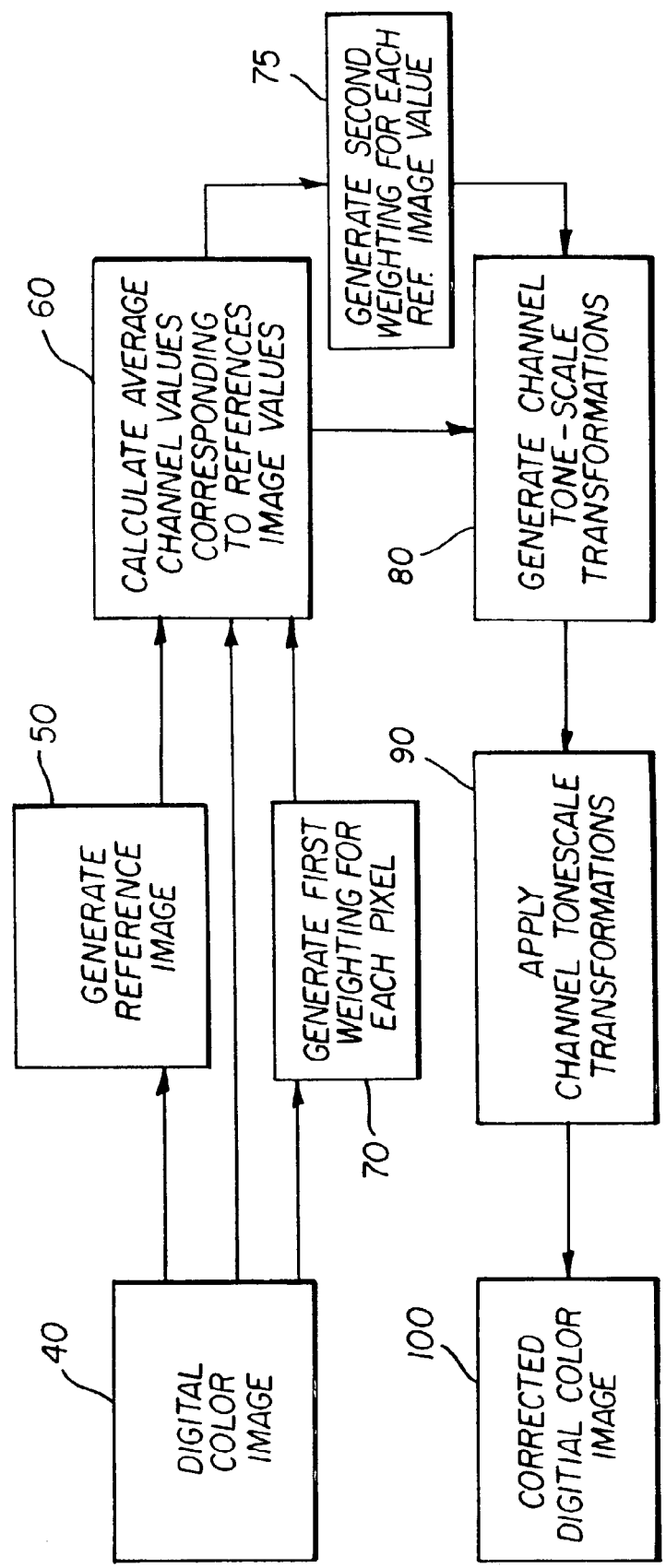
FIG. 5 is a schematic diagram illustrating a second embodiment of the digital image processing method according to the present invention.

FIG. 5 illustrates a second embodiment of the invention. As is the case with other color correction strategies, color failures can occur when the scene subject matter is highly colored, particularly with a single dominant color. To overcome this problem, additional sample weighting and constraints are employed as shown in FIG. 5. For instance, one or more additional steps are added to provide improved channel averages by weighting the image pixels used to form these averages (step 70), and to provide improved tone scale transformation by adjusting the contribution of each reference image value and corresponding channel average value to the regression used to form the tone scale transformation (step 75). Further improvement is possible if the regression between the reference image values and the channel averages is constrained.

An example of weighting used to generate improved channel averages is based on forming hue $H_{i,j}$ and saturation $S_{i,j}$ values at each image pixel in step 70:

$$H_{i,j} = \tan^{-1}\left[\frac{0.5 \cdot \sqrt{3} \cdot (g_{i,j} - b_{i,j})}{r_{i,j} - 0.5 \cdot (g_{i,j} + b_{i,j})}\right] \quad \text{Eq. 5}$$

$$S_{i,j} = \sqrt{r_{i,j} \cdot r_{i,j} + g_{i,j} \cdot g_{i,j} + b_{i,j} \cdot b_{i,j} - r_{i,j} \cdot g_{i,j} - r_{i,j} \cdot b_{i,j} - g_{i,j} \cdot b_{i,j}} \quad \text{Eq. 6}$$

After forming hue and saturation at each pixel, a weighted histogram of the hues is formed by adding the $S_{i,j}$ values corresponding to pixels with the same $H_{i,j}$ value, instead of by counting or adding the number of pixels at a particular $H_{i,j}$ value, as would be done with a regular histogram. This has the effect of populating each $H_{i,j}$ bin in the histogram with the summation of the saturation values of the pixels belonging to that bin, which in turn has the effect of weighting the hue by the saturation. The inverse of this weighted histogram, with a maximum possible inverse value, is used to weight pixels based on their $H_{i,j}$ value. In other words, each image pixel value that is used in the generation of a channel average is weighted by the inverse of the saturation values summed over all pixels having the same hue value as that of the image pixel.

Yet another example of weighting considers just the $S_{i,j}$ value. A histogram of $S_{i,j}$ values is formed and the inverse of this $S_{i,j}$ histogram, with a maximum possible inverse value, is used to weight pixels based on their $S_{i,j}$ value. Either of the above two described weightings can be used to weight pixels in the process of forming the channel averages.

A second weighting can be applied in step 75 to the regression process used to form the tone scale transformation function. The contribution of each reference image value and channel average data pair to a least squares or non-linear regression is adjusted based on this second weighting. An example of a second weighting is to form, at each reference image value, a saturation value based on the channel averages and use the inverse of this saturation value to weight the reference image values. This saturation value may be calculated by using red, green and blue channel average values in place of the pixel values in Equation (6).

Additional improvement is possible by adding constraints to the regression process. Exemplary constraints would include forcing the tone scale transformation to exactly map to relative white and/or black points as determined by other image processing steps, such as the white and black point methods cited in the background of the invention.

The present invention is useful, for example, for correcting the color reproduction of images that have experienced dye fading, images that were exposed under water or with tungsten or fluorescent illumination using daylight balanced film, or images derived from photographic prints that were incorrectly printed. After the digital image has been processed according to the present invention, it may be further processed, for example, by applying further tone scale adjustment algorithms.

The digital image produced by the current invention, or the further processed image just described can also be further processed by applying a color matrixing operation of the type disclosed in U.S. Pat. No. 5,673,336 issued Sep. 30, 1997 to Edgar et al., wherein a matrix is determined by crosscolor correlations from noise patterns identified in the image.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example: magnetic storage media such as a magnetic disc (e.g. a floppy disc or a hard drive) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

10 image processing system
12 input device
16 digital image processor
18 keyboard
20 mouse
22 color monitor
24 output device
26 color hardcopy print
28 digital image store
30 communications connection
40 digital color image
50 generating a reference image
60 calculating average channel values
70 generating first weighting for each pixel
75 generating second weighting for each reference value
80 generating channel tone scale transformations
90 applying channel tone scale transformations
100 corrected digital color image
105 histogram
110 red channel average
120 green channel average
130 blue channel average

What is claimed is:

1. A digital color image processing method for adjusting the tone scale reproduction of a color image composed of pixels provided in a plurality of color channels, said method comprising the steps of:

(a) generating a reference image from a combination of values of the pixels in the color channels, whereby each spatial coordinate of the reference image is characterized by a reference image level;

(b) generating channel averages of the color channel values of the pixels that correspond to the different valued reference image levels;

(c) forming a channel tone scale transformation by relating at least one channel average to its corresponding reference image level; and (d) utilizing the channel tone scale transformation on a pixel by pixel basis in the respective channels of the digital color image to produce a processed digital color image having improved tone scale reproduction.

2. The image processing method as claimed in claim 1, wherein the step (c) of forming a channel tone scale transformation comprises forming a look-up table that maps each channel average to its corresponding reference image level.

3. The image processing method as claimed in claim 1, wherein the step (c) of forming a channel tone scale transformation comprises regressing a set of channel averages versus a set of corresponding reference image levels.

4. The image processing method as claimed in claim 1 further comprising the step of weighting the color channel values of the pixels before the step (b) of generating channel averages of the color channel values of the pixels that correspond to each of a plurality of different valued reference image levels.

5. The image processing method as claimed in claim 4 wherein the color channel values of the pixels are weighted by either their hue or saturation values.

6. The image processing method as claimed in claim 4 wherein the color channel value of each weighted pixel is weighted by the inverse of the saturation values summed over all pixels having the same hue value as that of the weighted pixel.

7. The image processing method as claimed in claim 6 wherein the inverse of the saturation values is obtained from a histogram of the hue values, wherein each bin of the histogram is populated by the summation of the saturation values of the pixels within each bin.

8. The image processing method as claimed in claim 3 further comprising the step of weighting the reference image levels before regressing the set of channel averages versus the set of corresponding reference image levels.

9. The image processing method as claimed in claim 8 wherein the reference image levels are weighted by a saturation value based on the channel averages.

10. The image processing method claimed in claim 1, wherein the color channels are red, green and blue.

11. The image processing method claimed in claim 1, wherein the reference image is a linear combination of the color channels.

12. The image processing method claimed in claim 11, wherein the linear combination is expressed as $$W_{i,j} = C_1 \times r_{i,j} + C_2 \times g_{i,j} + C_3 \times b_{i,j},$$

where $C_1$, $C_2$, and $C_3$ are positive or zero valued constants and $r_{i,j}$, $g_{i,j}$, and $b_{i,j}$ are the values for the pixel located at coordinates i,j of the red, green, and blue digital color image channels.

13. The image processing method claimed in claim 12, wherein $C_1$, $C_2$, and $C_3$ sum to unity.

14. The image processing method claimed in claim 13, wherein $C_1$, $C_2$, and $C_3 = 1/3$.

15. The image processing method claimed in claim 1, further comprising the step of applying a color matrixing operation to the processed image.

16. The image processing method claimed in claim 15 wherein a color matrix employed in the matrixing operation is determined by crosscolor correlations from noise patterns identified in the image.

17. A computer program product for performing the method of claim 1 comprising computer readable storage medium having a computer program stored thereon.

18. A digital color image processing system for adjusting the tone scale reproduction of a color image composed of pixels provided in a plurality of color channels, said system comprising:

(a) means for generating a reference image from a combination of values of the pixels in the color channels, whereby each spatial coordinate of the reference image is characterized by a reference image level;

(b) means for generating channel averages of the color channel values of the pixels that correspond to the different valued reference image levels;

(c) means for forming a channel tone scale transformation by relating at least one channel average to its corresponding reference image level; and (d) means for utilizing the channel tone scale transformation on a pixel by pixel basis in the respective channels of the digital color image to produce a processed digital color image having improved tone scale reproduction.

19. The image processing system as claimed in claim 18, wherein said means for forming a channel tone scale transformation comprises means for forming a look-up table that maps each channel average to its corresponding reference image level.

20. The image processing system as claimed in claim 18, wherein said means for forming a channel tone scale transformation comprises means for regressing a set of channel averages versus a set of corresponding reference image levels.

* * * * *